METHOD OF ASSEMBLING A NONDESTRUCTIVE READ-OUT MEMORY

Filed Jan. 31, 1967

J.W. FAGERSTROM
W.C. KENT

BY

ATTORNEY

United States Patent Office 3,448,515
Patented June 10, 1969

3,448,515

METHOD OF ASSEMBLING A NONDESTRUCTIVE READ-OUT MEMORY

Joseph W. Fagerstrom, Johnstown, and William C. Kent, Gahanna, Ohio, assignors to Western Electric Company, Incorporated, New York, N.Y., a corporation of New York Filed Jan. 31, 1967, Ser. No. 612,896
Int. Cl. B23p *19/04;* H01f *7/06*
U.S. Cl. 29—604 9 Claims

ABSTRACT OF THE DISCLOSURE

A method of assembling elements of a nondestructive read-out memory includes the steps of securing one end of a section of a multiconductor access cable to a support stick and threading one end of each conductor of the access cable through an associated one of a plurality of magnetic cores supported on the stick. The section of the access cable is then folded to place the opposite end thereof adjacent to the support stick, and the ends of each of the conductors are connected together to form individual conductor loops supported by the section of the access cable. An information storage-sensing cable is threaded through an opening formed by the folded section of the access cable, and the folded section of the access cable is bonded to the information storage-sensing cable.

BACKGROUND OF INVENTION

This invention relates to methods of assembling a nondestructive read-out memory and more particularly relates to methods of assembling a multiconductor information storage-sensing cable with folded sections of a multiconductor access cable.

A recent development resulted in a new and improved type of electrically alterable nondestructive read-out memory as disclosed in an article entitled "Piggyback Twistor" appearing on pages 206 and 207 of the June 1964 issue of the Bell Laboratories Record. The piggyback twistor includes a twistor cable having a plurality of spaced, parallel twistors which are capable of storing information as well as sensing the stored information for the purpose of providing a read-out of the stored information. Each twistor includes a fine copper conductor with a pair of twin narrow tapes, each composed of different magnetic materials, wrapped helically about the copper wire one on top of the other in a piggyback fashion. Sections of an access cable, which includes flat parallel spaced copper ribbons, are folded about the piggyback twistor cable so that the copper ribbons are substantially perpendicular to the spaced, parallel twistors of the piggyback twistor cable thereby locating a memory storage position at the intersection of each pair of piggyback twistors and each of the copper ribbons. The piggyback twistor functions in a manner similar to magnetic memory circuits described in U.S. Patent 3,067,408, issued to W. A. Barrett, Jr. on Dec. 4, 1962.

In the past, a continuous length of the access cable was cut into predetermined lengths to form sections of the cable. One end of each of a plurality of the sections of the access cable were then assembled individually with individual support sticks and the copper ribbons extending from one end of the section were looped through associated magnetic cores previously attached to each of the sticks. Successive portions of a continuous length of the piggyback twistor cable were then positioned successively over and adhesively bonded to substantially one-half of one surface of each of the sections of the access cable adjacent to the associated support sticks with the twistors of the twistor cable perpendicular to the copper ribbons of the sections of access cable.

Subsequently, the sections of the access cable were folded successively to position and facilitate the bonding of the other half of the one surface of the section of access cable in engagement with the opposite side of the portion of piggyback twistor cable. The ends of each copper ribbon of the section of the access cable were connected to form individual continuous loops of copper ribbons surrounding the piggyback twistor cable in a perpendicular relation with the twistors of the twistor cable. The plurality of sections of the access cable were assembled with the single continuous length of the piggyback twistor cable in this manner and the assembly was folded in a serpentine fashion to form the nondestructive read-out piggyback twistor memory.

Since the copper ribbons of each of the plurality of sections of the access cable were connected in loop fashion after the assembly of each section with the piggyback twistor cable, the individual sections of the access cable, including the looped copper ribbons and the individual associated magnetic cores, had to be tested after the entire memory was assembled. In the event elements of the access cable, including the connection of the looped copper ribbons and the magnetic cores, had been damaged sufficiently to cause the memory to function improperly, portions of the assembled memory had to be disassembled to locate and remove, or repair, the faulty components.

SUMMARY OF THE INVENTION

It is, therefore, an object of this invention to provide new and improved methods of assembling a nondestructive read-out memory.

Another object of this invention is to provide new and improved methods of assembling sections of a multiconductor access cable with a multiconductor information storage-sensing cable to form memory storage positions at each crosspoint of the conductors of the individual cables.

Still another object of this invention is to provide new and improved methods of assembling a continuous length of a multiconductor information storage sensing cable with a plurality of prefolded sections of a multiconductor access cable with the conductors of the information storage-sensing cable, which facilitates the testing of assembled elements of the prefolded sections of the access cable prior to assembly of the sections with the information storage-sensing cable.

A method of embodying certain features of the invention includes the steps of folding a section of a multiconductor access cable to form continuous conductor loops supported by the section and threading a multiconductor information storage-sensing cable through the folded section of the access cable so that the conductor loops of the access cable are perpendicular to the conductors of the information cable.

BRIEF DESCRIPTION OF THE DRAWING

Other objects and features of the present invention will be more readily understood from the following detailed description of specific embodiments thereof when read in conjunction with the appended drawings, in which.

DETAILED DESCRIPTION

Figures 1, 5, 6:
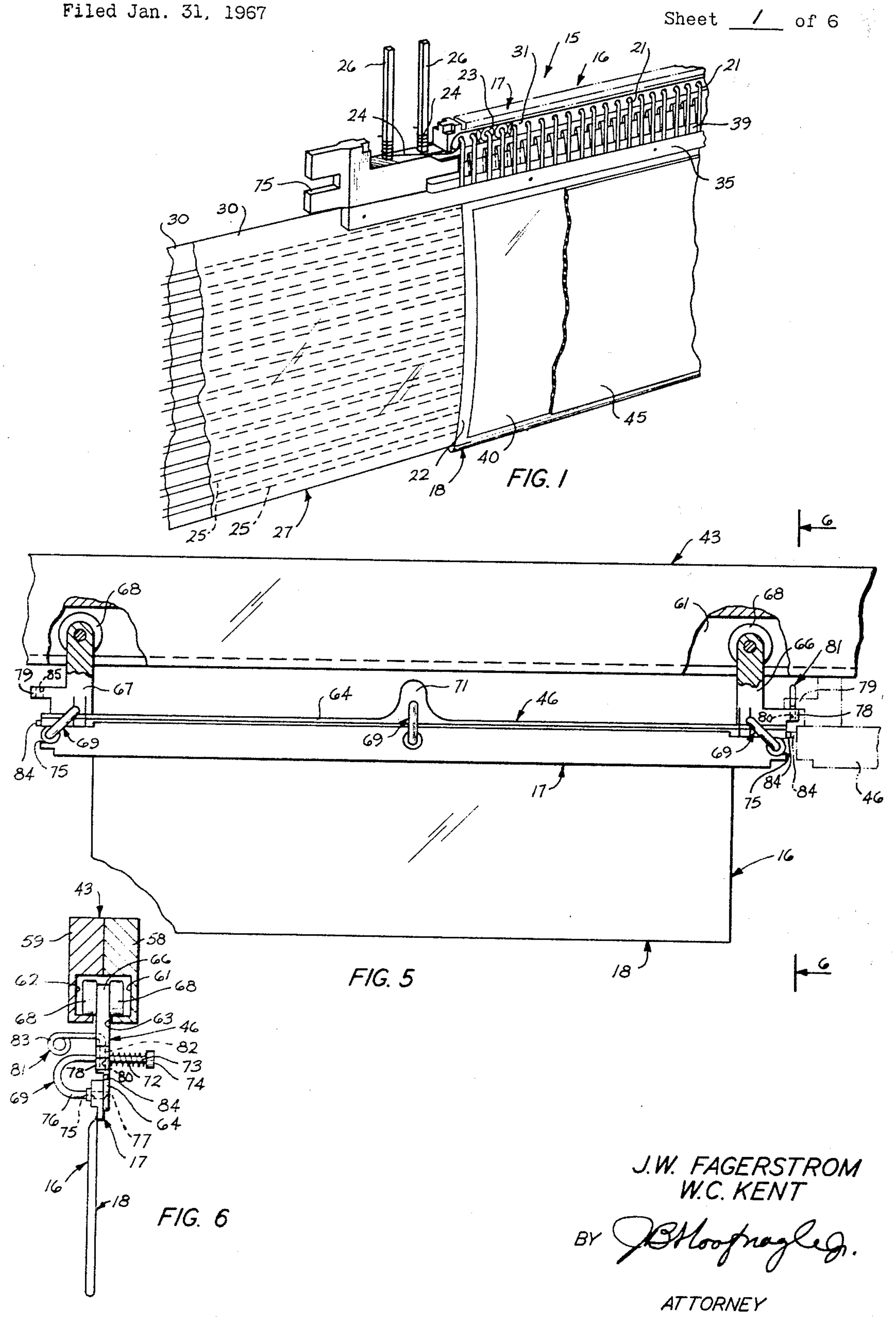
FIG. 1 is partial perspective view showing portions of assembled components of a nondestructive read-out memory.
FIG. 5 is an enlarged partial view of FIG. 4 showing in detail portions of the apparatus for supporting an access subassembly of a nondestructive read-out memory.
FIG. 6 is a sectional view taken along line 6—6 of FIG. 5 showing details of the supporting apparatus.

Referring now to FIG. 1, a nondestructive read-out memory, as described in the above-identified article entitled "Piggyback Twistor," includes a plurality of completed assemblies (one shown), designated generally by the reference numeral 15. Each assembly 15 includes an access subassembly, designated generally by the reference numeral 16, which consists of a plastic support stick, designated generally by the reference numeral 17, for supporting a folded section of a flat access cable, designated generally by the reference numeral 18. Thet section 18 of the flat accessible cable includes a plurality of parallel spaced copper ribbons 21—21 which are bonded adhesively to one surface of a polyester film 22 and are exposed on the inner surfaces of the folded section of the cable.

The ends of each copper ribbon 21 of the section 18 of the flat access cable are stripped from the polyester film and the transverse portions of the film at the ends of the section are removed therefrom. One end of each copper ribbon 21 of the section 18 is looped through an asssociated magnetic switching core 23 which is bonded adhesively in position on the support stick 17 so that a continuous loop conductor passes through each of a plurality of the magnetic switching cores 23—23 supported on the stick. A pair of core drive wires 24—24 are interweaved through the magnetic switching cores 23—23, which are bonded to the support stick 17, and are secured at opposite ends thereof to associated terminal posts 26—26 which are mounted on the support stick.

A flat, multiconductor, information storage-sensing cable, such as a twistor cable, designated generally by the reference numeral 27, is positioned within the opening formed by the folded section 18 of the flat access cable so that twistors 25—25 of the twistor cable are positioned substantially perpendicular to the copper ribbons 21—21 of the section of the access cable. The individual twistors 25—25 are formed in a manner described in the above-identified article "Piggyback Twistor" and are encapsulated between sheets 30—30 of polyester film to provide the composite-carrier twistor cable 27.

A plastic retention stick 35 is positioned over the overlapping ends of the folded access cable section 18 and is nailed to the support stick 17 to insure the retention of the access cable section with the support stick 17.

Thin sheets 40—40 of Permalloy are bonded to opposite sides of the folded section 18 of the flat access cable. In addition, a foam polyurethane plastic pad 45 is bonded on top of the Permalloy sheet 40 on opposite sides of alternate assemblies 15—15. As disclosed in the above-identified article "Piggyback Twistor," a plurality of the in-line completed assemblies 15—15 are folded in a serpentine fashion to provide a nondestructive read-out module. The Permalloy sheets 40—40 isolate each completed assembly 15 from adjacent assemblies within the memory module. In addition, the foam plastic pads 45—45 cushion and sufficiently space adjacent completed assemblies 15—15 in the completed nondestructive read-out memory module.

Figure 2:
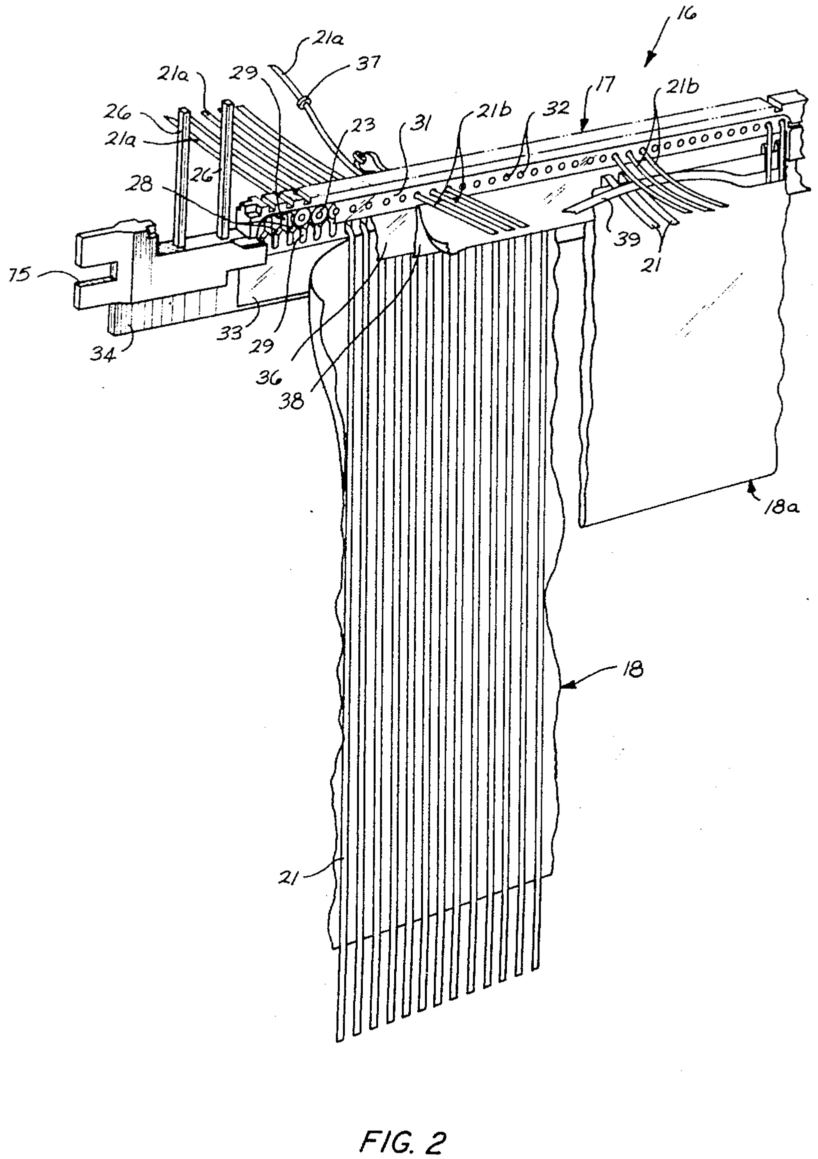
FIG. 2 is a partial perspective view showing various components of an access subassembly of a nondestructive read-out memory.
Figure 3:
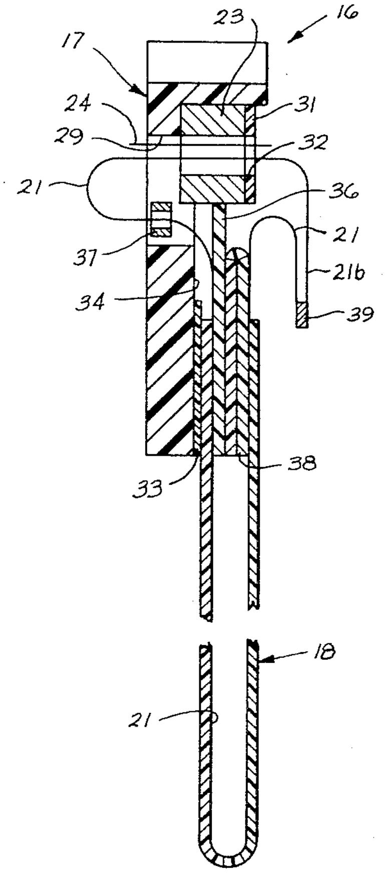
FIG. 3 is a sectional view showing the arrangement of the various components of an access subassembly for a nondestructive read-out memory.

Referring now to FIGS. 2 and 3, in assembling the various elements which form the access subassembly 16, a plurality of the magnetic switching cores 23—23 are positioned on associated support shoulders 28—28 adjacent to an associated one of a plurality of elongated slots 29—29 formed in the support stick 17, and are bonded adhesively in this position. A plastic protective cover 31, having a plurality of apertures 32—32 formed therein, is positioned over the exposed surfaces of the magnetic switching cores 23—23 to protect the cores during subsequent handling operations. In addition, the apertures 32—32 of the plastic cover 31 are aligned with the associated openings of the magnetic switching cores 23—23 and, further, with the upper ends of the slots 29—29 to facilitate subsequent threading operations.

Referring further to FIGS. 2 and 3, in order to support initially each folded section 18 of the access cable with the associated support stick 17, one surface of a flat plastic tape 33, having an adhesive on both surfaces thereof, is positioned on a portion of a surface 34 of the support stick 17 beneath the slots 29—29 and the assembled magnetic switching cores 23—23. Thereafter, the section 18 of the access cable, with the ends of the copper ribbons 21—21 being stripped from the supporting polyester film 22 and the transverse portions of the film removed from the ends of the section 18, is positioned so that one end of the section of access cable is adjacent to the exposed adhesive surface of the plastic tape 33.

The ends of the copper ribbons 21—21, extending from the one end of the section 18 of the access cable adjacent to the plastic tape 33, are inserted through the lower portions of associated slots 29—29 and are pulled through the slots from the opposite side of the support stick 17, as shown in FIG. 2, by ends **21*a*—21*a*. The one end of the section 18 of the access cable, which is adjacent to the plastic tape 33, is placed into engagement with the tape so that the section of the access cable is held with the support stick 17** and suspends therefrom, as viewed in FIG. 2.

Referring further to FIGS. 2 and 3, a second flat plastic tape 36, having an adhesive on one surface thereof, is positioned over the lower portions of the slots 29—29 on the surface 34 of the support stick 17. Lower portions of the tape 36 overlap the upper end of the section 18 of the access cable to facilitate additional securing of the section of the access cable to the stick 17 and to further seal over the portions of the slots 29—29 which are contiguous with the surface 34 of the support stick.

A shuttle suppression magnetic core 37 is threaded onto each of the ends **21*a*—21*a* of the copper ribbons 21—21 extending through the associated slots 29—29 and are moved substantially into the lower portion of the slot but are precluded from passing through the associated slot by the plastic tape 36 which seals over the opposite side of each slot. The shuttle suppression cores 37—37 inhibit the switching of an associated magnetic switching core 23 unless the associated core 23** has been properly selected.

The ends of the copper ribbons 21—21 of the section 18 of the access cable, which extend through the lower portions of associated slots 29—29, are then passed through the upper portions of the associated slots and further through the openings formed in the associated magnetic switching cores 23—23. The ends of the copper ribbons 21—21 extend from the side of the support stick 17, as shown by ends **21*b*—21*b***.

A third plastic tape 38 having an adhesive on one surface thereof is folded about its longitudinal axis so that the adhesive surface is exposed on the outer surfaces of the folded tape. One longitudinal portion of the exposed adhesive surface of the tape 38 is pressed into bonding engagement over the nonadhesive exposed surface of the plastic tape 36, thereby exposing the remaining portion of the adhesive surface of the folded tape 38.

The free end of the section 18 of the access cable is moved to a position adjacent to the exposed portion of the adhesive surface of the plastic tape 38 so that a fold is formed in the section, as shown by section 18*a* of the access cable in FIG. 2. The free end of the folded section 18 of the access cable is then pressed into bonding engagement with the exposed adhesive surface of the folded plastic tape 38 to retain the section of the access cable in the folded position.

A continuous length of a phosphorous bronze strip 39 is positioned transversely between opposite ends of each copper ribbon 21, as shown above in section 18*a* of the access cable in FIG. 2, and the ends of the copper ribbons are welded to the strip. The phosphorous bronze strip 39 is utilized to facilitate the connecting of copper to copper. Subsequent to the welding of opposed ends of each copper ribbon 21 to the phosphorous bronze strip 39, the strip is folded downwardly adjacent to the outer surface of the upper portion of the section 18*a* of the access cable, as viewed in FIG. 2, to complete the assembling of the access subassembly 16.

At this time, before the access subassemblies 16—16 are assembled with the twistor cable 27, each access subassembly is tested to determine if the various elements of the subassembly will function properly. Damaged and improperly functioning elements of the tested subassemblies 16—16 can be replaced or repaired with little effort. In the past these tests could not be performed until the access subassemblies 16—16 were bonded to the twistor cable 27 and assembled as the nondestructive read-out memory module. Repair efforts, in the past, required considerable time because portions of the assembled module had to be disassembled to gain access to the faulty elements.

Figure 4:
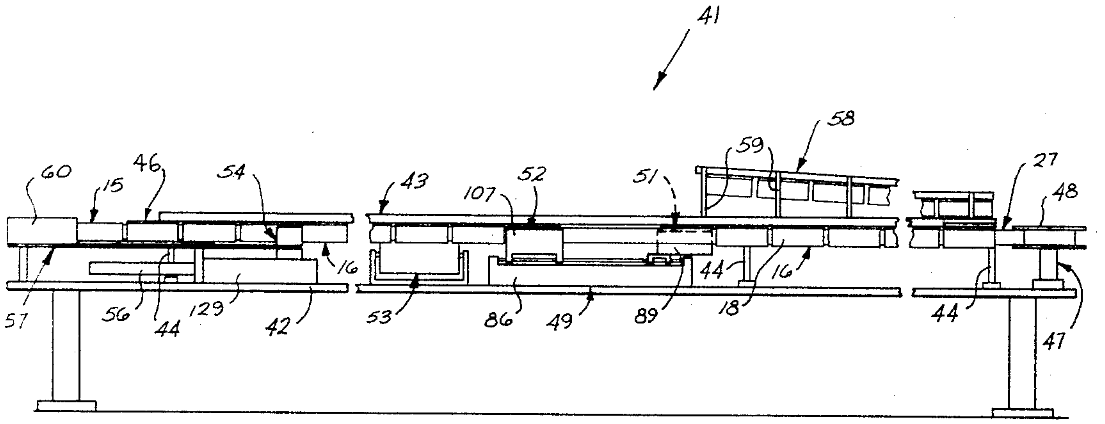
FIG. 4 is a side view showing an apparatus embodying certain features of the invention.

Referring now to FIG. 4, an assembly apparatus, designated generally by the reference numeral 41, embodying certain features of the invention, is mounted on a table 42. The apparatus 41 includes a longitudinal overhead guide rail, designated generally by the reference numeral 43, which extends substantially along the length of the table 42 and is supported above the table by a plurality of curved stands 44—44. The overhead rail 43 is designed to support a plurality of carriers, designated generally by the reference numerals 46—46 (FIGS. 5, 6 and 7), which carries suspended access subassemblies 16—16. One of the access subassemblies 16—16 is attached to each associated carrier 46, which is then positioned on the guide rail 43 from the right end thereof, as viewed in FIG. 4, in line with other suspended subassemblies 16—16.

A cable supply stand, designated generally by the reference numeral 47, is mounted on the right end of the table 42 and supports a supply reel 48 of a continuous length of the twistor cable 27. Both surfaces of the flat twistor cable 27 are coated with an adhesive and covered with a protective paper to prevent adjacent surfaces of the cable from being bonded together on the reel and to the access subassemblies 16—16 prior to the desired time. The leading end of the supply of the continuous length of twistor cable 27 is drawn from the supply reel 48 and is threaded through the openings of the folded access cable sections 18—18 of the aligned, supported access subassemblies 16—16. The leading end of the continuous length of the twistor cable 27 is then pulled to a position substantially to the left of the middle of the guide rail 43 and is secured at this point to prevent retrograde movement.

Referring further to FIG. 4, a sleeving and bonding apparatus, designated generally by the reference numeral 49, includes a vacuum clamp, designated generally by the reference numeral 51, for holding tautly adjacent successive portions of the continuous length of the twistor cable 27 while successive access cable sections 18—18 are bonded adhesively to opposite sides of the twistor cable. The apparatus 49 further includes opposed vacuum clamps, designated generally by the reference numbers 52—52, for gripping opposite outer sides of each of successive folded sections 18—18 of the access subassemblies 16—16 and to spread opposed sides of the folded sections 18—18 apart sufficiently to facilitate movement of the open folded sections successively over and in aligned position with portions of the continuous length of the twistor cable 27 which will have exposed adhesive surfaces. Subsequently, after the protective paper is removed from successive portions of the twistor cable 27, the vacuum clamp 52 can be moved laterally to place the inner surfaces of successive folded access cable sections 18—18 into bonding engagement with the exposed adhesive surfaces of successive portions of the continuous length of twistor cable.

Referring further to FIG. 4, a back-up plate, designated generally by the reference numeral 53, is mounted on the table 42 adjacent to the path of travel of the suspended access subassemblies 16—16. After the access cable sections 18—18 of successive subassemblies 16—16 have been bonded to successive portions of the twistor cable 27, the back-up plate 53 supports successive support sticks 17—17 during a period when the plastic stick 35 (FIG. 1) is nailed over the folded overlapping ends of each of the successive access cable sections to insure the retention of each access cable section with the associated support stick.

After the plastic sticks 35—35 have been attached to the associated support sticks 17—17 to firmly secure the successive access cable sections 18—18 with the support sticks, the sheets 40—40 (FIG. 1) of Permalloy, each having an adhesive surface on one side, are bonded lightly to the outer surfaces of each side of each folded section 18 of successive access subassemblies 16—16. The assemblies are then moved to the left, as viewed in FIG. 4, and the access cable sections 18—18 having the Permalloy sheets 40—40 bonded thereto are positioned adjacent to a rolling mechanism, designated generally by the reference number 54. The rolling mechanism 54 is controlled by a fluid cylinder 56 which moves the mechanism along the then stationary Permalloy sheets 40—40 and presses the sheets firmly onto the outer surfaces of the folded sections 18—18 of successive access subassemblies 16—16. The Permalloy sheets 40—40 function as a magnetic shield between adjacent assemblies which include the access cable sections 18—18 and the portions of the twistor cable 27 bonded thereto.

Subsequently, the foam pads 45—45 (FIG. 1) are bonded over the Permalloy sheets 40—40 on alternate sides of successive subassemblies 16—16 to form the completed assembly 15 and successive completed assemblies are folded in a serpentine fashion on a platform, designated generally by the reference numeral 57, supported on the left end of the table 42. After a desired number of completed assemblies 15—15 have been folded in a serpentine fashion, the folded assemblies are mounted in a module housing 60 and wired to complete the nondestructive read-out memory as disclosed in the article entitled "Piggyback Twistor."

Referring further to FIG. 4, a gravity feed rail, designated generally by the reference numeral 58, extends above the guide rail 43 and is supported by a plurality of curved stands 59. Prior to the positioning of the carriers 46 (FIGS. 5, 6 and 7) on the guide rail 43, one of the access subassemblies 16—16 is attached to each carrier which is then positioned on the left end of the gravity feed rail 58 so that successive carriers approach the right end of the gravity feed rail 58 in preparation for and to facilitate a subsequent operation of positioning the carriers, supporting the access subassemblies, on the guide rail 43.

Referring now to FIG. 6, the guide rail 43 includes a pair of identical sections 58 and 59 which are formed with longitudinal grooves 61 and 62, respectively. Portions of the sections 58 and 59 are cut away adjacent to the grooves 61 and 62, respectively, to provide a longitudinal opening 63 when the sections are assembled to form the guide rail 43.

Referring now to FIGS. 5 and 6, each carrier 46 includes a longitudinal body member 64 having roller support legs 66 and 67 extending upwardly at opposite ends of the top of the member. A pair of rollers 68—68 are mounted for rotation on opposite sides of each of the free ends of the roller support legs 66 and 67.

Three spring-biased J-pins, designated generally by the numerals 69—69, are attached to the carrier 46. Two of the J-pins 69—69 are attached at opposite ends of the carrier 46 in the roller support legs 66 and 67. The third J-pin 69 is attached to a projection 71 which extends upwardly from the center of the body member 64. Referring now to FIG. 6, each of the J-pins 69—69 includes a long leg 72 which extends through the carrier 46. A compression spring 73 is positioned over the free end of the leg 72 and a nut 74 is secured to the free end of the leg so that the spring will normally urge the leg 72 to the right, as viewed in FIG. 6. Each J-pin also includes a short leg 76 which extends into one of a plurality of openings 77—77 formed in the carrier 46.

Referring to FIGS. 5 and 6, initially, the J-pins 69—69 are moved to withdraw the associated legs 76—76 from the associated apertures 77—77 of the body member 64. The back surface of one of the support sticks 17—17 is positioned in engagement with the body member 64 whereafter the J-pins 69—69 are moved to position the legs 76—76 of the pins through associated openings 75—75 in the stick 17 and into the associated openings 77—77 of the body member 64 of the carrier 46 thereby facilitating the attachement of the access subassembly 16 to the carrier 46.

The carrier 46, with the supported access subassembly 16, is then moved to facilitate the positioning of the rollers 68—68 within the opposed grooves 61 and 62 of the guide rail 43. The opening 63 formed between the sections 58 and 59 of the guide rail 43 is sufficiently wide to permit the passage of the roller support legs 66 and 67 therethrough thereby facilitating movement of the carrier 46 along the guide rail.

As viewed in FIG. 5, the right end of the body member 64 is formed with a projection 78 extending laterally from a lower portion of the roller support leg 66. The left end of the body member 64 of the carrier 46 is formed with a projection 79 which extends laterally from an intermediate portion of the roller support leg 67. Each of the projections 78 and 79 of the carrier 46 are provided with apertures 80 and 85, respectively. When adjacent carriers 46—46 are located in a desired position, the projection 79 of a succeeding carrier 46, as shown in phantom in FIG. 5, is positioned over the projection 78 of the preceding carrier with the apertures of each projection in axial alignment. A hitch pin, designated generally by the reference numeral 81, includes a latching leg 82 (FIG. 6) and a handle portion 83. The latching leg 82 is positionable within the aligned apertures 80 and 85 of the projections 78 and 79, respectively, of adjacent carriers 46—46 to connect successive carriers together and facilitate in-line movement of the carriers and accurate positioning of successive access subassemblies 16—16.

As further viewed in FIG. 5, bumper pins 84—84 are mounted on opposite ends of the body member 64 of the carrier 46 to facilitate proper positioning of the carriers during the operation when successive access cable sections 18—18 are being bonded to successive portions of the adhesive surfaces of the twistor cable 27.

Figures 7, 9:
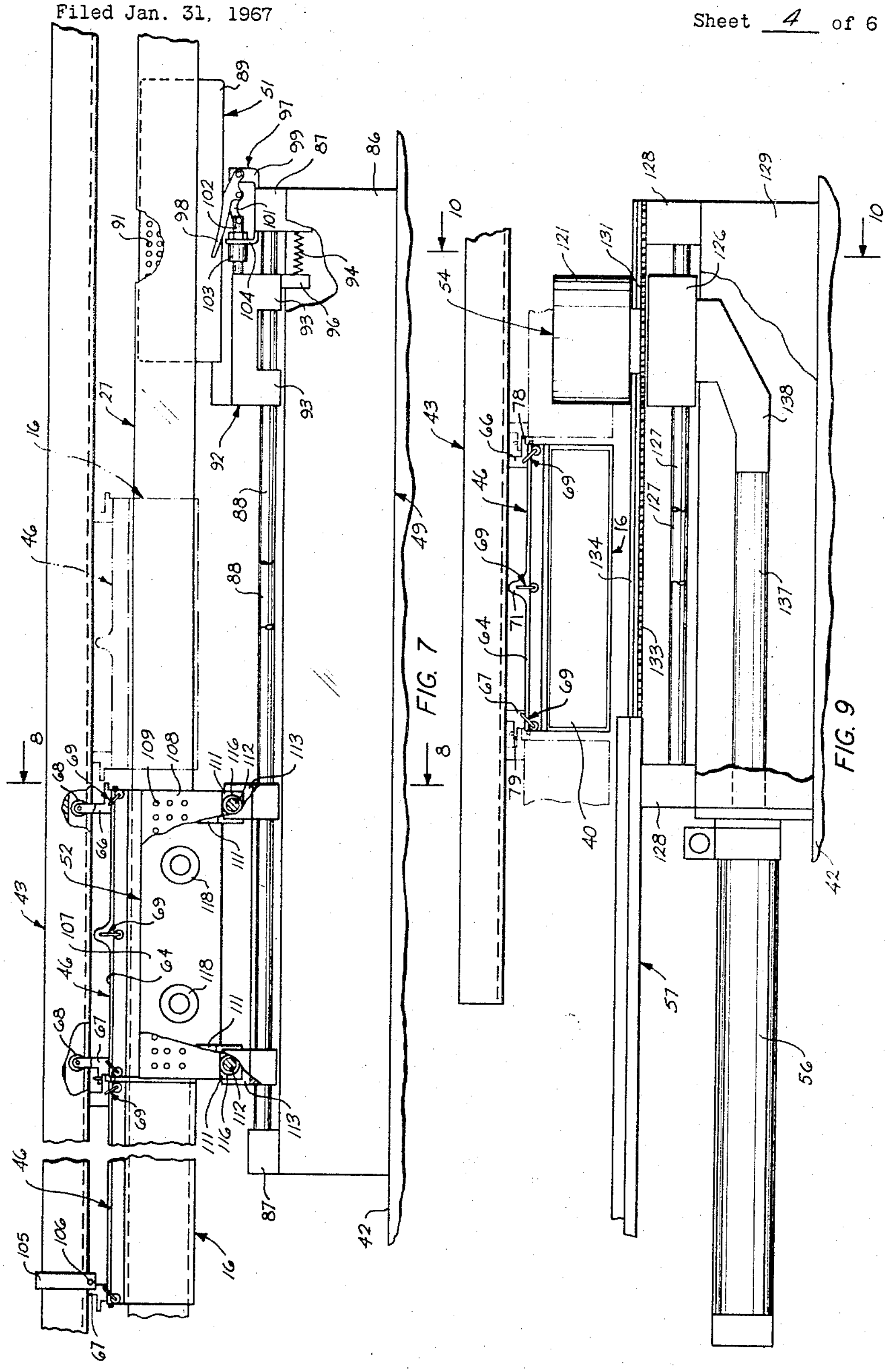
FIG. 7 is an enlarged partial view of FIG. 4 showing in detail portions of an apparatus for clamping various components of a nondestructive read-out memory during the assembly of the components.
FIG. 9 is an enlarged partial view of FIG. 4 showing in detail a rolling mechanism for pressing together various bonded components of a nondestructive read-out memory.

Referring now to FIGS. 4 and 7, the continuous length of the twistor cable 27 extends through openings of successive folded sections 18—18 of hitched subassemblies 16—16 supported by the carriers 46—46 in the rail 43 to the right of the sleeving and bonding apparatus 49. The subassemblies 16—16 are hitched together at this position to facilitate the simultaneous movement of all the subassemblies when one of the subassemblies is moved. With the leading end of the continuous length of the twistor cable 27 secured at a position to the left of the vacuum clamp 52, the leading carrier 46, which is positioned to the right of the vacuum clamp 51, is unhitched from the adjacent carrier and is moved past the vacuum clamp 51 and over the adjacent portions of the twistor cable 27 having the protective paper over the adhesive surfaces thereof. The unhitched carrier 46 is moved to a position, as shown in phantom view in FIG. 7, with the supported access subassembly 16 suspending therefrom.

Referring now to FIG. 7, the sleeving and bonding apparatus 49 includes a platform 86 which is mounted on the table 42. Rail support blocks 87—87 are mounted on top of opposite ends of the platform 86 and support the opposite end of a pair of spaced parallel guide rails 88—88 which extend therebetween.

The vacuum clamp 51 includes a vacuum plate 89 composed of a conventional porous metal or, as illustrated, it may be provided with a plurality of apertures 91—91 to facilitate the vacuum gripping of successive portions of the twistor cable 27. The left lower end of the vacuum plate 89, as viewed in FIG. 7, is secured to a slide, designated generally by the reference numeral 92. The slide 92 includes four spaced bearing legs 93—93 which are positioned on the guide rails 88—88 for sliding movement thereon. One end of a compression spring 94 is secured to a projecting portion 96 of the slide 92. The opposite end of the compression spring 94 is secured to a fixed portion of the platform 86 thereby normally urging the slide 92 to the right, as viewed in FIG. 7.

A toggle mechanism, designated generally by the reference numeral 97, is mounted on a selected one of the guide rail supports 87—87 at the right end of the platform 86. The toggle mechanism 97 includes a pivotal toggle lever 98 secured to a fixed bracket 99 and further includes a bell crank portion 101 secured pivotally at one end thereof to an intermediate portion of the lever and secured at the opposite end thereof to one end of a pin 102. A bearing guide 103 is supported by a fixed bracket 104 which is attached fixedly to the selected guide rail support 87 on the right end of the platform 86. The pin 102 is positioned for sliding movement through the bearing block 103 so that when the toggle lever 98 of the toggle mechanism 97 is moved to a position as shown in FIG. 7, the free end of the pin will move to the left. As the pin 102 is moved to the left, the free end of the pin engages the slide 92 to preclude movement of the slide to the right.

When it is desired to hold a portion of the twistor cable 27 taut during a period when the inner surfaces of the folded access cable section 18 are being bonded to the exposed adhesive surfaces of the twistor cable, the toggle lever 98 is moved to a position as shown in FIG. 7 to urge the slide 92 to the left against the biasing action of the compression spring 94. In addition, a pin 106 is inserted through a bracket 105, attached to the guide rail 43, adjacent to the roller leg support 66 of one of the preceding carriers 46—46 to preclude retrograde movement of preceding access subassemblies 16—16 which are bonded to forward portions of the twistor cable 27. Thereafter, the portion of the twistor cable 27 adjacent to the vacuum plate 89 is aligned properly and a vacuum is applied through the apertures 91—91 of the plate to grip vacuumly the portion of the twistor cable adjacent to the plate. The toggle lever 98 is then pivoted in a clockwise direction, as viewed in FIG. 7, to move the pin 102 to the right so that the compression spring 94 urges the slide 92 to the right. As the slide 92 is moved to the right, the vacuum plate 89 is moved to the right and removes slack from the portion of the twistor cable 27 extending between the area of the pin 106 and the vacuum plate.

Figure 8:
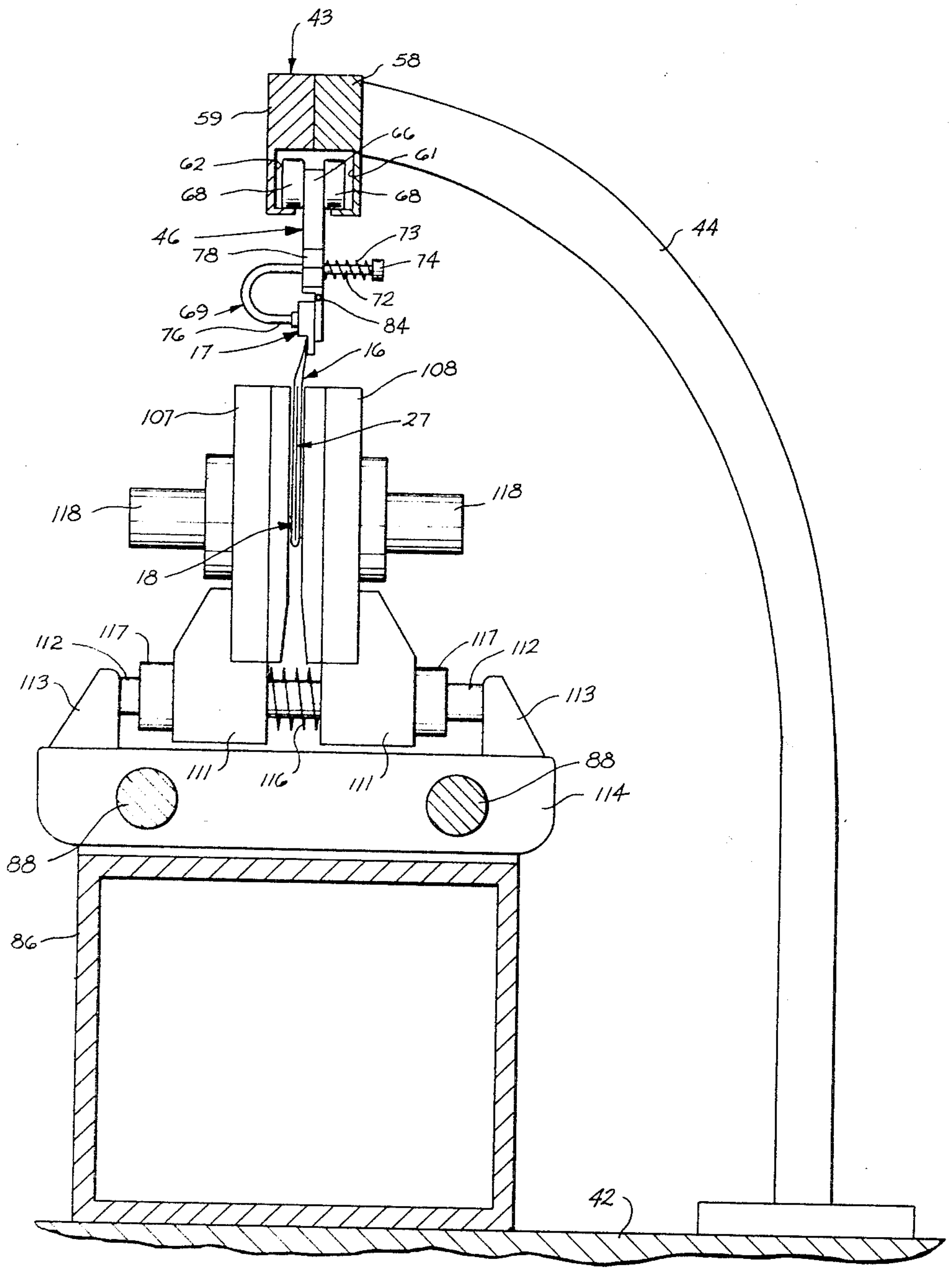
FIG. 8 is an enlarged sectional view taken along line 8—8 of FIG. 7 showing details of a portion of the clamping apparatus.

Referring to FIGS. 7 and 8, the vacuum clamps 52—52 include a pair of spaced, opposed vacuum plates 107 and 108 which are composed of a conventional porous metal or, as illustrated, they may be provided with a plurality of apertures 109. Each of the vacuum plates 107 and 108 are mounted on bearing supports 111—111. The bearing supports 111—111 are mounted on a pair of guide rails 112—112. The opposite ends of the guide rails 112—112 are secured fixedly within brackets 113—113 which are attached to opposite sides of a pair of spaced slide blocks 114—114. The slide blocks 114—114 are mounted for sliding movement on the spaced guide rails 88—88 to facilitate manual movement of the vacuum clamps 52—52 along the guide rails 88—88.

Referring to FIG. 8, compression springs 116—116 are positioned about the guide rails 112—112 between the bearing supports 111—111 to normally urge apart the vacuum plates 107 and 108. In addition, collars 117—117 are mounted on the guide rails 112—112 to limit the maximum spacing between the vacuum plates 107 and 108. It is noted that the spacing between the plates 107 and 108 is sufficient to permit movement of the vacuum clamps 52—52 over the folded section 18 of the access subassembly 16, as viewed in FIG. 8.

After the suspended access subassembly 16 has been moved to a position as shown in phantom lines in FIG. 7, and further after the adjacent portion of the twistor cable 27 has been drawn taut by the vacuum clamp 51, the vacuum clamps 52—52 are moved manually to the right from the position shown in FIG. 7 to a position adjacent to the suspended access subassembly. Due to the spacing between the vacuum plates 107 and 108, as viewed in FIG. 8, the vacuum clamps 52—52 slide over the suspended access subassembly 16 so that the vacuum plates are positioned on opposite sides of the suspended access subassembly. Thereafter, vacuum is applied to the vacuum plates 107 and 108 and the opposite sides of the folded access cable section 18 of the suspended access subassembly 16 are secured to the plates 107 and 108 as a result of differential pressures to provide an increased opening between the inner surfaces of opposite sides of the folded access cable section.

Referring to FIG. 7, the portions of the protective paper on both sides of the twistor cable 27, which are adjacent to the original position of the vacuum clamps 52—52, as shown in FIG. 7, are removed manually from both sides of the twistor cable to expose the adhesive surfaces thereof. Thereafter, the vacuum clamps 52—52 are moved manually to the left, thereby carrying the secured, suspended access subassembly 16 with the vacuum clamps to a position adjacent to the exposed adhesive surfaces of the twistor cable 27. Since the securing of the opposite sides of the folded access cable section 18 increases the spacing between the opposite sides, the inner surfaces of the folded section do not engage the exposed adhesive surfaces of the twistor cable 27 during movement of the vacuum clamps 52—52 to the position shown in FIG. 7.

As the vacuum clamp 52 is moved to the left and approaches the position as shown in FIG. 7, the bumper pin 84 of the associated carrier 46, which supports the moved access subassembly 16, engages the bumper pin of the preceding carrier to locate the vacuumly gripped access cable section 18 accurately adjacent to the exposed adhesive surfaces of the twistor cable 27. Thereafter, the hitch pin 81 is inserted into the aligned openings of the projections 78 and 79 of the adjacent carriers 46—46 to retain the proper relative positions between the access cable section 18 and the adjacent portions of the twistor cable 27.

Referring to FIGS. 7 and 8, the vacuum plates 107 and 108 are then urged manually together against the biasing action of the compression springs 116—116 to press the inner surfaces of the opposite sides of the supported access cable section 18 firmly into bonding engagement with the exposed adhesive surfaces of the twistor cable 27. Subsequently, the vacuum applied to the vacuum plates 107 and 108 is released through the manual operation of a series of valves 118—118 and the plates are again urged apart by the biasing action of the compression spring 116. In this manner the vacuum clamps 52—52 releases the outer surfaces of the access cable section 18 which is now bonded to the adjacent portion of the twistor cable 27. The pin 106 is removed from the bracket 105 and the vacuum is removed from the vacuum clamp 51 to release the gripped portion of the twistor cable 27. The carrier 46 which supports the access subassembly 16 which was just bonded to the twistor cable 27 is moved to the left, as viewed in FIG. 7, thereby moving the preceding hitched carriers and associated bonded assemblies to the left for subsequent operations.

Successive access subassemblies 16—16 are moved to the position shown in phantom view in FIG. 7 and the vacuum clamp 51 is operated successively to draw the twistor cable 27 taut. The vacuum clamps 52—52 are operated successively to grip and move the successive access subassemblies 16—16 to a position adjacent to exposed adhesive surfaces of successive portions of the twistor cable 27 and to thereafter facilitate the bonding of the successive subassemblies to the successive portions of the twistor cable.

Referring to FIG. 4, successive bonded assemblies are positioned adjacent to the back-up plate 53 to facilitate the attachment of successive plastic retention sticks 35—35 (FIG. 1) to successive support sticks 17—17, as previously described. Thereafter, the Permalloy sheets 40—40 (FIG. 1) are bonded lightly to opposite sides of each outer surface of successive access cable sections 18—18.

Figure 10:
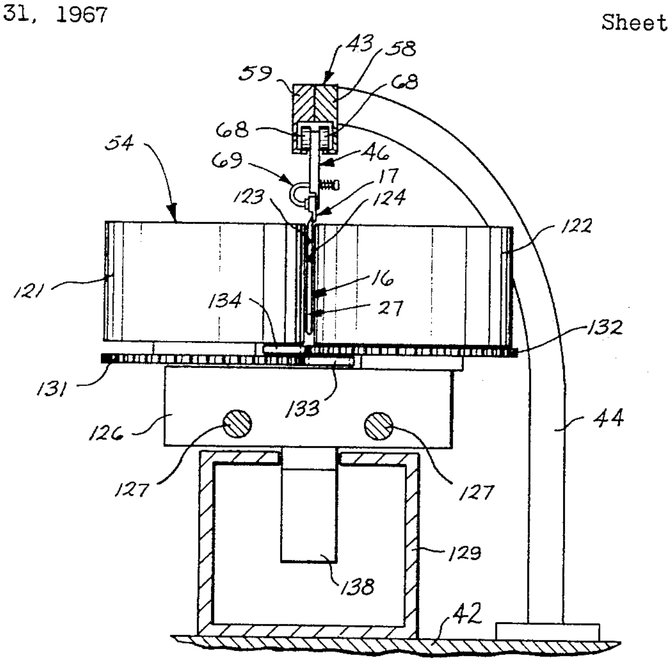
FIG. 10 is a sectional view taken along line 10—10 of FIG. 9 showing details of the rolling mechanism.

Referring to FIGS. 9 and 10, as the hitched carriers 46—46 are moved to the left from the vacuum clamp 52 (FIGS. 4 and 7), as previously described, each bonded assembly supported by each carrier is positioned as viewed in FIG. 9 adjacent to the rolling mechanism 54. The rolling mechanism 54 includes a pair of spaced, opposed rollers 121 and 122 having flat portions 123 and 124, respectively, on the peripheral surfaces thereof which are opposed when the rolling mechanism is in a rest position, as viewed in FIGS. 9 and 10, to facilitate movement of the bonded assemblies therebetween.

Each of the rollers 121 and 122 is mounted for rotation on a bearing platform 126 which is positioned on spaced guide rails 127—127 for sliding movement thereon. The end of the guide rails 127—127 are mounted in rail support blocks 128—128 which are supported on a platform 129 on top of the table 42. A pair of gears 131 and 132 are secured for rotation with the rollers 121 and 122, respectively. A pair of racks 133 and 134 are secured fixedly at opposite ends thereof and extend between the rail support blocks 128—128 and are in mesh engagement with the gears 131 and 132, respectively.

Referring to FIG. 9, the fluid cylinder 56 is attached fixedly to the left end of the platform 129 and controls reciprocable movement of a rod 137. One end of a connecting tongue 138 is secured to the rod 137 and the opposite end of the tongue is attached to the underside of the bearing platform 126. When the fluid cylinder 56 is operated to move the rod 137 to the left as viewed in FIG. 9, the bearing platform 126 is moved along the guide rails 127—127 thereby moving the rollers 121 and 122 to the left from the position shown in FIG. 9. As the rollers 121 and 122 are moved to the left as viewed in FIG. 9, the gears 131 and 132, respectively, which are in mesh engagement with the fixed racks 133 and 134, respectively, are rotated. The rotational movement of the gears 131 and 132 causes the rollers 121 and 122, respectively, to rotate so that the flat portions 123 and 124, respectively, are rotated away from a position adjacent to the continuous length of twistor cable 27 and the access subassemblies 16—16 bonded thereto. Subsequently, the rounded remaining peripheral portions of the rollers 121 and 122 engage the Permalloy sheets 40—40 on opposite sides of the access subassembly 16, as viewed in FIG. 9, where, upon continued linear movement of the rollers to the left and resultant rotation of the rollers, the Permalloy sheets are urged against and bonded firmly to outer surfaces of the access subassembly. Subsequently, the rod 137 of the fluid cylinder 56 is moved in the reverse direction to return the rollers 121 and 122 to a position as viewed in FIG. 9.

After each operation of bonding the Permalloy sheets 40—40 (FIG. 1) to successive access subassemblies 16—16, the subassemblies are moved successively to the left of the rolling mechanism 54, as viewed in FIG. 4, where the foam plastic pads 45—45 (FIG. 1) are bonded separately to opposite sides of each alternate access subassembly to form successive completed assemblies 15—15 (FIG. 1). The successive completed assemblies 15—15 are folded in a serpentine fashion in the module housing 60 positioned on the platform 57 to form a nondestructive readout memory module as shown in the article "Piggyback Twistor."

ALTERNATE EMBODIMENT FOR APPLYING PERMALLOY SHEETS

Figure 11:
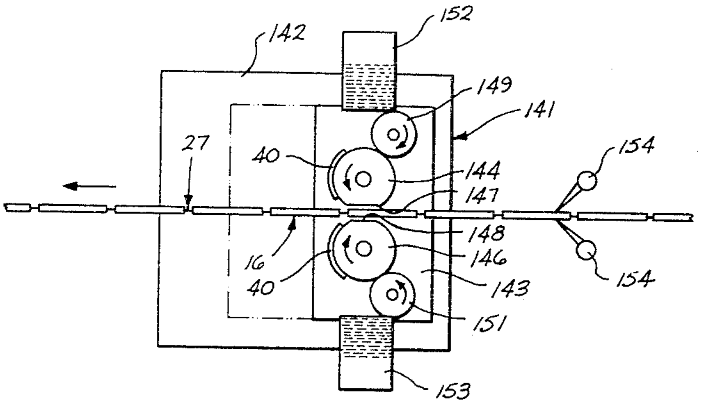
FIG. 11 is a plan view showing an alternate embodiment of an apparatus for assembling together various components of a nondestructuve read-out memory.

Referring to FIG. 11, an apparatus, designated generally by the reference numeral 141, discloses an alternate arrangement for applying and bonding the Permalloy sheets 40—40 to successive access subassemblies 16—16 in a position on the table 42 (FIG. 4) in place of the rolling mechanism 54 (FIG. 4). The apparatus 141 includes a fixed platform 142 which houses mechanism for moving a bearing platform 143 in a manner similar to the control of the movement of the bearing platform 126 by the fluid cylinder 56. The bearing platform 143 supports for rotation a first pair of opposed applicator rollers 144 and 146. A portion of each of the peripheral surfaces of the rollers 144 and 146 are formed with flat surfaces 147 and 148, respectively, which are normally opposed, as shown in FIG. 11, to facilitate passage of successive access subassemblies 16—16 which are bonded to the continuous length of twistor cable 27. A pair of pick-up rollers 149 and 151, respectively, are mounted for rotation on the bearing platform 143 adjacent to the rollers 144 and 146 respectively.

The Permalloy sheets 40—40 are loaded into separate spring loaded magazines 152 and 153 which are secured fixedly to the platform 142 adjacent to the rollers 149 and 151, respectively. The magazines 152 and 153 support a plurality of the Permalloy sheets 40—40 positioned in parallel with the in-line access subassemblies 16—16 supported by the hitched carriers 46—46 (FIG. 4).

Each of the peripheries of the rollers 144, 146, 149 and 151 are provided with a magnetized rubber pad (not shown) which is capable of supporting one of the Permalloy sheets 40—40 by magnetic attraction. However, it is noted that the rollers 144, 146, 149 and 151 could be magnetized in a conventional manner rather than have magnetized rubber pads. The mechanism for moving the bearing platform 143 includes conventional features for preventing the rotation of the rollers 144, 146, 149 and 151 when the platform is returned from a position shown in phantom lines to the position as shown in solid lines in FIG. 11.

Prior to the operation of the apparatus 141, a pair of adhesive applicators 154—154 apply an adhesive to the outer surfaces of opposite sides of successive folded sections 18—18 of the access subassemblies 16—16. Subsequently, the access subassemblies 16—16 are positioned successively to the left of the rollers 144 and 146, as shown in FIG. 11. Thereafter, the bearing platform 143 is moved to the left to rotate the rollers 144, 146, 149 and 151. As the rollers 149 and 151 are rotated in directions as shown by the associated arrows and further as the platform 143 is moved to the left, the leading sheets 40—40 of Permalloy in the supplies 152 and 153, respectively, are drawn magnetically onto the magnetized rubber pads on the periphery of the rollers 149 and 151, respectively, to peel the leading sheets of Permalloy from the supply stacks.

During this period, sheets 40—40 of the Permalloy previously deposited on the round peripheral portion of the rollers 144 and 146 are pressed into engagement with the adhesive surfaces of the outer sides of the folded section 18 of the stationary access subassembly 16.

An inherent characteristic of the Permalloy sheets 40—40 is the capability of the sheets to retain themselves in a linear plane in the absence of an external force. The Permalloy sheets 40—40 are peeled successively from the stack of supplies 152 and 153 by the pick-up rollers 149 and 151, respectively, and the leading end of the sheets on the rollers subsequently passes between the pick-up rollers and the adjacent applicator rollers 144 and 146, respectively. Since it is a characteristic of the Permalloy sheets 40—40 to tend to retain themselves in a plane, when the sheets pass between the adjacent associated sets of rollers 144, 149 and 146, 151, the magnetic attraction on opposite sides of the sheets at this point exerts a substantially equal force and tends to neutralize the pull of the opposing rollers. At this time the leading end of each of the Permalloy sheets 40—40 attempts to follow a more linear path and leans away from the magnetic pull of the associated pick-up rollers 149 and 151 and are thereby attracted by the magnetized rubber pads on the associated applicator rollers 144 and 146.

As the bearing platform 143 moves to the left, as viewed in FIG. 11, the Permalloy sheets 40—40 are transferred from the pick-up rollers 149 anad 151 to the applicator rollers 144 and 146, respectively, so that when the bearing platform reaches the left end of travel, the transferred Permalloy sheets 40—40 are in a position on the rollers 144 and 146 as viewed in FIG. 11. When the bearing platform 143 returns to the solid line view in FIG. 11, the rollers 144, 146, 149 and 151 are precluded from rotating by a unidirectional clutch or other appropriate mechanism (not shown).

During the next cycle, the previously transferred Permalloy sheets 40—40 shown on the applicator rollers 144 and 146 are transferred onto the outer adhesive surfaces of the adjacent access subassembly 16 in the manner previously described. The force of the adhesive bonding of the Permalloy sheets 40—40 to the outer sides of the access subassembly 16 are sufficient to overcome the attraction force of the magnetized rubber pads on the periphery of the applicator rollers 144 and 146 thereby permitting the application and bonding of the sheets onto the access subassembly as the rollers pass adjacent to the subassembly.

It is to be understood that the above-described arrangements are simply illustrative of the invention. Other arrangements may be devised by those skilled in the art which will embody the principles of the invention and fall within the spirit and scope thereof.

What is claimed is:

1. A method of assembling elements of a memory unit including at least one switching element, sections of a multiconductor access cable and a multiconductor information storage-sensing cable, which comprises the steps of:

folding a section of a multiconductor access cable so that individual conductors of the cable form individual conductor loops with each conductor loop being located adjacent to an associated switching element, and threading a length of a multiconductor information storage-sensing cable through openings formed by the looped conductors of the section so that a memory storage position is formed at each crosspoint between one of the looped conductors of the folded section of the access cable and one of the conductors of the information storage-sensing cable.

2. A method of assembling elements of a memory unit including sections of a multiconductor access cable and a multiconductor information storage-sensing cable, which comprises the steps of:

folding a section of a multiconductor access cable so that individual conductors of the cable form individual conductor loops;

spreading the opposite sides of the folded section after folding the section; and threading a length of a multiconductor information storage-sensing cable through openings formed by the looped conductors of the section so that a memory storage position is formed at each cross point between one of the looped conductors of the folded section of the access cable and one of the conductors of the information storage-sensing cable.

3. A method of assembling elements of a memory unit including at least one switching element, a multiconductor access cable and a multiconductor information storage-sensing cable, which comprises the steps of:

connecting together the ends of each conductor of a multiconductor access cable to form a plurality of individual conductor loops, and threading a length of a multiconductor information storage-sensing cable through openings formed by the looped conductors of the access cable so that a memory storage position is formed at each crosspoint between one of the looped conductors of the access cable and one of the conductors of the information storage-sensing cable.

4. A method of assembling elements of a memory unit including sections of a multiconductor access cable and a multiconductor information storage-sensing cable, which comprises the steps of:

folding a plurality of individual sections of a multiconductor access cable, connecting together the ends of each conductor of the plural sections of the access cable so that each folded section of the cable supports a plurality of individual spaced conductor loops, and threading a length of a multiconductor information storage-sensing cable through openings formed by the plural folded sections of the access cable so that memory storage positions are formed at each crosspoint between one of the looped conductors of the folded sections of the access cable and one of the conductors of the information storage-sensing cable.

5. The method as set forth in claim 4 including the step of threading one end of each of the conductors of the access cable through a magnetic switching core after folding the section of access cable.

6. The method as set forth in claim 4 including the step of bonding successively the sections of the access cable with successive portions of the information storage-sensing cable.

7. The method as set forth in claim 6 including the steps of:

holding taut successive portions of the information storage-sensing cable after the threading of the cable through the folded sections of the access cable, spreading successively the opposite sides of each folded section of the access cable so that an opening formed by the folded section is increased, and moving relatively the successive spread folded sections of the access cable to a position adjacent to the successive, tautly held portions of the information storage-sensing cable to facilitate the bonding of the successive folded sections to the successive, tautly held portions of the information storage-sensing cable.

8. The method as set forth in claim 4 including the step of bonding sheets of magnetic shielding material on the outer surfaces of opposite sides of each folded section of the access cable.

9. The method as set forth in claim 4 including the step of folding the information storage-sensing cable in a serpentine fashion to position the successive access cable sections in a stacked parallel relation.

References Cited

UNITED STATES PATENTS

| | | |
|---|---|---|
| 3,201,767 | 8/1965 | Bradley. |
| 3,218,615 | 11/1965 | Reimer et al. |
| 3,391,396 | 1/1968 | McAlexander ----- 29—604 XR |

FOREIGN PATENTS

| | | |
|---|---|---|
| 944,764 | 12/1963 | Great Britain. |

JOHN F. CAMPBELL, *Primary Examiner.*

ROBERT W. CHURCH, *Assistant Examiner.*

U.S. Cl. X.R.

29—433, 624; 340—174

PO-1050
(5/69)

UNITED STATES PATENT OFFICE
CERTIFICATE OF CORRECTION

Patent No. 3,448,515 Dated June 10, 1969

Inventor(s) JOSEPH W. FAGERSTROM-WILLIAM C. KENT

It is certified that error appears in the above-identified patent and that said Letters Patent are hereby corrected as shown below:

Column 1, change title from "Method of Assembling A Nondestructive Read-Out Memory" to --Methods of Assembling A Nondestructive Read-Out Memory--. Column 3, line 33, change "thet" to --the--; line 34, change "accessible" to --access--. Column 12, line 28, change "anad" to --and--. Column 13, line 18, after "loops" add --with each conductor loop being located adjacent to an associated switching element--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents